United States Patent
Blasinski et al.

(10) Patent No.: US 11,195,247 B1
(45) Date of Patent: Dec. 7, 2021

(54) CAMERA MOTION AWARE LOCAL TONE MAPPING

(71) Applicant: Apple Inc., Cupertino, CA (US)

(72) Inventors: Henryk K. Blasinski, Stanford, CA (US); Xuemei Zhang, Mountain View, CA (US); Yingjun Bai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 16/777,074

(22) Filed: Jan. 30, 2020

Related U.S. Application Data

(60) Provisional application No. 62/897,731, filed on Sep. 9, 2019.

(51) Int. Cl.
| | |
|---|---|
| *G06T 7/00* | (2017.01) |
| *G06T 1/00* | (2006.01) |
| *G06T 5/50* | (2006.01) |
| *G06T 5/00* | (2006.01) |
| *G06T 5/40* | (2006.01) |

(52) U.S. Cl.
CPC ............ *G06T 1/0007* (2013.01); *G06T 5/008* (2013.01); *G06T 5/50* (2013.01); *G06T 5/40* (2013.01); *G06T 2207/20221* (2013.01)

(58) Field of Classification Search
CPC . G06T 2207/10016; G06T 2207/20012; G06T 5/002; G06T 5/20; H04N 5/2351
See application file for complete search history.

(56) References Cited

U.S. PATENT DOCUMENTS

| | | | | |
|---|---|---|---|---|
| 10,861,127 | B1 * | 12/2020 | Terree | G06K 9/00624 |
| 2010/0157078 | A1 * | 6/2010 | Atanassov | G06T 5/007 |
| | | | | 348/222.1 |
| 2016/0358584 | A1 * | 12/2016 | Greenebaum | G06T 11/001 |
| 2018/0108327 | A1 * | 4/2018 | Jung | G06T 5/008 |
| 2018/0359410 | A1 * | 12/2018 | Ain-Kedem | H04N 5/232123 |
| 2019/0228505 | A1 * | 7/2019 | Douady-Pleven | H04N 5/2328 |
| 2020/0126509 | A1 * | 4/2020 | Nasiopoulos | H04N 19/142 |
| 2020/0167901 | A1 * | 5/2020 | Fors | G06T 5/50 |

OTHER PUBLICATIONS

Aydin, Tunç Ozan, et al. "Temporally coherent local tone mapping of HDR video." ACM Transactions on Graphics (TOG) 33.6 (2014): 1-13.*

(Continued)

*Primary Examiner* — Li Liu
(74) *Attorney, Agent, or Firm* — Blank Rome LLP

(57) ABSTRACT

An electronic image capture device captures a first image of a scene at a first time. A first local tone mapping operator for a first portion of the first image is determined. The electronic image capture device further captures a second image of the scene at a second time. A motion of the electronic device between the first time and the second time is determined. A second local tone mapping operator for a second portion of the second image is determined. The second portion is determined to correspond to the first portion based, at least in part, on the determined motion of the electronic device. The second local tone mapping operator is determined based, at least in part, on the first local tone mapping operator. At least the second local tone mapping operator is applied to the second portion of the second image.

23 Claims, 5 Drawing Sheets

(56) References Cited

OTHER PUBLICATIONS

Y. Chen, W. Lin, C. Zhang, Z. Chen, N. Xu and J. Xie, "Intra-and-Inter-Constraint-Based Video Enhancement Based on Piecewise Tone Mapping," in IEEE Transactions on Circuits and Systems for Video Technology, vol. 23, No. 1, pp. 74-82, Jan. 2013, doi: 10.1109/TCSVT.2012.2203198.*

Popovic, Vladan, et al. "Multi-camera platform for panoramic real-time HDR video construction and rendering." Journal of Real-Time Image Processing 12.4 (2016): 697-708.*

\* cited by examiner

CAMERA MOTION AWARE LOCAL TONE MAPPING

TECHNICAL FIELD

This disclosure relates generally to the field of image processing and, more particularly, to various techniques to generate and re-using local tone mapping curves in image processing.

BACKGROUND

Tone mapping is the process of remapping pixel intensity values (e.g., gray levels) for portions of a given input image to different levels in the corresponding portions of a "tone mapped" output image. Tone mapping may, e.g., alter the pixel intensity values of different portions of the image to adapt the image to how the scene would be perceived by the human visual system. In general, there are two approaches to tone mapping: global and local. Global tone mapping refers to the situation where there is a single tone curve that maps input pixel intensity values to output pixel intensity values. Local tone mapping refers to the case where a tone curve is applied to less than an entire image. In practice, tone mapping may be used to compress the dynamic range of an input (e.g., captured) image to fit into the dynamic range of an output device with the goal of not losing spatial and color details. This usually involves darkening the input image's bright regions and brightening up the input image's darker regions while keeping local spatial contrast intact.

Tone mapping is one of the image processing operations that is fundamental in achieving a desired final image appearance. Many tone mapping algorithms use a variety of image statistics to estimate how image brightness should be changed. However, even small changes in the framing of the input image (e.g., when the camera is panning, when an object being captured is moving (i.e., internal scene motion)) can have a large impact on the image statistics, and as a result, on the local tone mapping curves that should be applied to a given portion of the image. As a result, the same object in a scene may be tone mapped in different ways in consecutively captured frames, thereby causing the same object to have a drastically changed appearance in the consecutively captured frames. This, in turn, can lead to generation of visible artifacts (e.g., flicker in a video, banding when image frames are stitched together to generate a panorama, poor contrast, saturation, and the like) in certain situations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, an image processing method comprises: capturing, with an electronic image capture device, a first image of a scene at a first time; determining a first parameter for a local image processing operation (e.g., local tone mapping) for a first portion of the first image; capturing, with the electronic image capture device, a second image of the scene at a second time; determining a motion of the electronic image capture device between the first time and the second time; determining a second parameter for the local image processing operation (e.g., local tone mapping) for a second portion of the second image, wherein the second portion is determined to correspond to the first portion based, at least in part, on the determined motion of the electronic image capture device, and wherein the second parameter (e.g., second tone curve or operator) is determined based, at least in part, on the first parameter (e.g., first tone curve or operator); and applying at least the second parameter to the second portion of the second image to perform the local image processing operation for the second image.

In another embodiment, an image processing device comprises: an image sensor; memory; and one or more processors operatively coupled to the image sensor and the memory, wherein the memory comprises instructions that, when executed by the one or more processors, cause the one or more processors to: capture, with the image sensor, a first image of a scene at a first time; determine a first local tone mapping operator for a first portion of the first image; capture, with the image sensor, a second image of the scene at a second time; determine a motion of the image sensor between the first time and the second time; determine a second local tone mapping operator for a second portion of the second image, wherein the second portion is determined to correspond to the first portion based, at least in part, on the determined motion of the electronic image capture device, and wherein the second local tone mapping operator is determined based, at least in part, on the first local tone mapping operator; and apply at least the second local tone mapping operator to the second portion of the second image to local tone map the second image.

In yet another embodiment, the instructions to cause the image processing device to perform the techniques enumerated above may be embodied in computer executable program code and stored in a non-transitory storage device. In yet another embodiment, the image processing method could be implemented on a corresponding image processing device and/or portable electronic device.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

Figure 1:
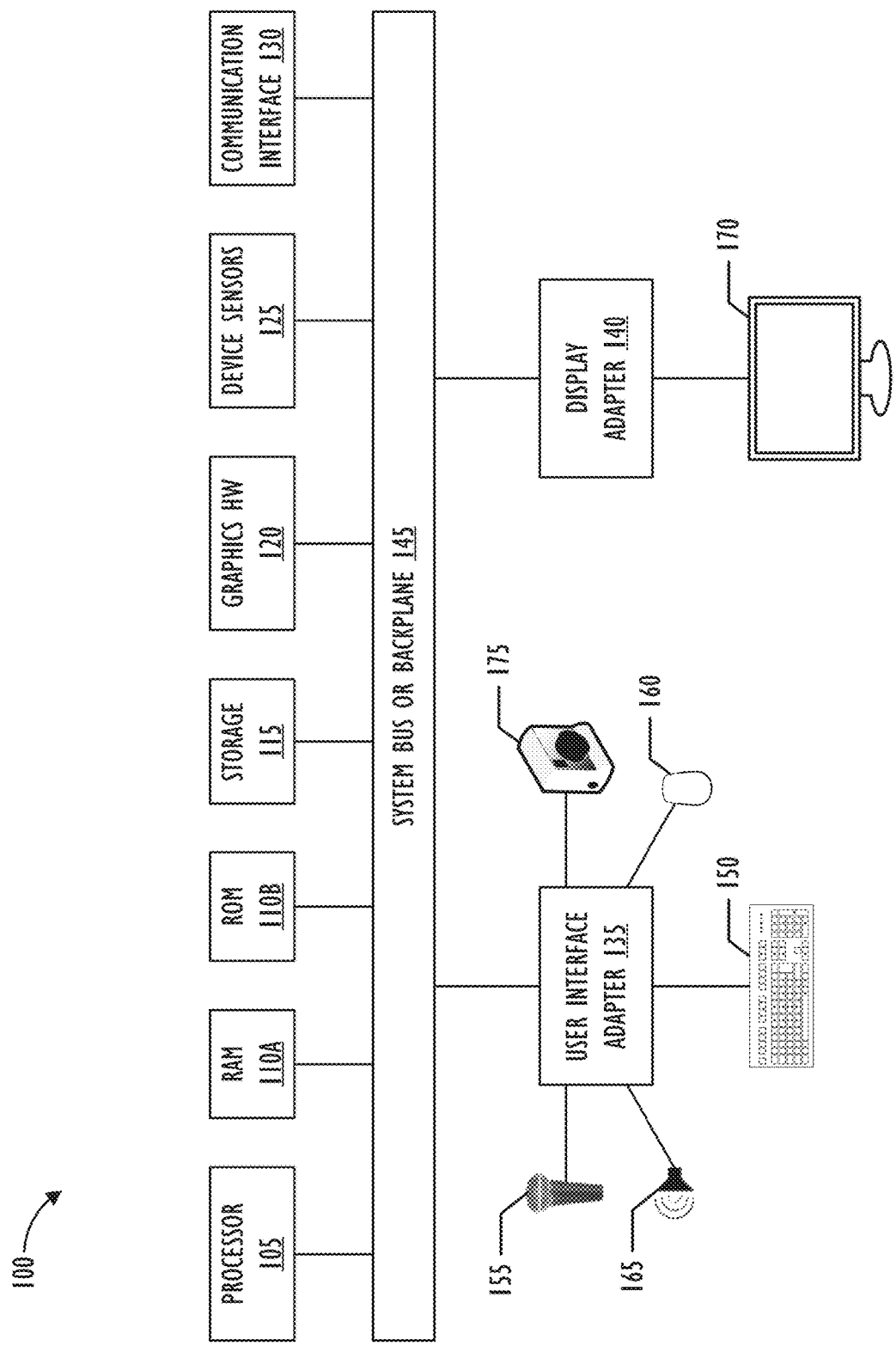
FIG. 1 is a simplified functional block diagram of an illustrative computer system, in accordance with one or more embodiments.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class, of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

This disclosure pertains to performing image processing operations on successively captured image frames, such that a parameter for a local image processing operation derived for a portion of a previously captured image frame is utilized in performing an image processing operation on a corresponding portion of a subsequently captured image frame. Techniques disclosed herein look to successively capture image frames for different imaging applications like video, panorama, and the like. In one embodiment, a local tone mapping (LTM) operator (e.g., LTM curve, tone curve, and the like) may be derived for a first portion of a first image frame based on image data of a scene captured in the first image frame. The LTM operator may then be applied to the first portion of the first image frame so as to perform an image processing operation. Subsequently, a second image frame may be captured and subjected to an image processing operation, such that a second portion of the second image frame that is determined to correspond to the first portion of the first image frame is processed, at least in part, using the LTM operator that was derived for the first portion. The LTM operator applied to the second portion of the second image frame may be the same as the LTM operator applied to the first portion of the first image frame or an interpolation of two or more LTM operators from the first image frame, one of which includes the LTM operator derived for the first portion. Alternately, the LTM operator applied to the second portion may be derived by blending (e.g., weighted average) the LTM operator (or corresponding image statistics) derived for the first portion of the first image frame (or an LTM operator that was determined via interpolation based on the LTM operator derived for the first portion of the first image frame and one or more other LTM operators derived for other portions of the first image frame) with one or more local and/or global tone mapping operators (or corresponding image statistics) derived exclusively based on image data of a scene captured in the second image frame (i.e., independently of the image data of the first image frame).

Correspondence between the respective first and second portions of the first and second image frames may be determined based on data from a sensor such as an inertial measurement unit (IMU), which may determine a motion of the camera between a time when the first image frame is captured and a time when the second image frame is captured. Alternately, or in addition, correspondence between the respective first and second portions of the first and second image frames may be determined based on image-to-image registration techniques (e.g., feature selection followed by feature matching and homography estimation using Random Sample Consensus (RANSAC)). Consequently, an object or portion of a scene being captured by the consecutively captured image frames may be tone mapped in the same way in the different image frames, despite camera motion between the consecutive image frame captures which may cause the visual field captured in each frame (and resulting LTM curves or other image processing parameters for the same object) to change. As a result, when the image frames are stitched together (as in the case of a panorama) or are displayed sequentially (as in the case of a video), the occurrence of visual artifacts such as incorrect tone mapping, banding, or flicker, is reduced. The above technique of applying LTM curves from preceding frames to portions of succeeding frames can also be implemented to perform other local image processing operations, e.g., local color correction operations, local noise filtering operations, local object-based denoising or optimizing operations, and the like.

Referring to FIG. 1, the disclosed embodiments may be performed by representative computer system 100 (e.g., a general-purpose computer system or a dedicated image processing workstation). Computer system 100 may include one or more processors 105, memory 110 (110A and 110B), one or more storage devices 115, graphics hardware 120, device sensors 125 (e.g., proximity sensor/ambient light sensor, accelerometer and/or gyroscope, inertial measurement unit (IMU)), communication interface 130, user interface adapter 135 and display adapter 140 —all of which may be coupled via system bus or backplane 145. Memory 110 may include one or more different types of media (typically solid-state) used by processor 105 and graphics hardware 120. For example, memory 110 may include memory cache, read-only memory (ROM) 110B, and/or random access memory (RAM) 110A. Storage 115 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 110 and storage 115 may be used to retain media (e.g., audio, image and video files), preference information, device profile information, computer program instructions organized into one or more modules and written in any desired computer programming language, and any other suitable data. When executed by processor 105 and/or graphics hardware 120 such computer program code may implement one or more of the methods described herein. Communication interface 130 may be used to connect computer system 100 to one or more networks. Illustrative networks include, but are not limited to: a local network such as a USB network; a business' local area network; or a wide area network such as the Internet and may use any suitable technology (e.g., wired or wireless). User interface adapter 135 may be used to connect keyboard 150, microphone 155, pointer device 160, speaker 165 and other user interface devices such as image capture device 175 or a touch-pad and/or a touch screen (not shown). Display adapter 140 may be used to connect one or more display units 170 (e.g., liquid crystal display (LCD) panel, organic light emitting diode (OLED) display panel, and the like).

Figure 3:
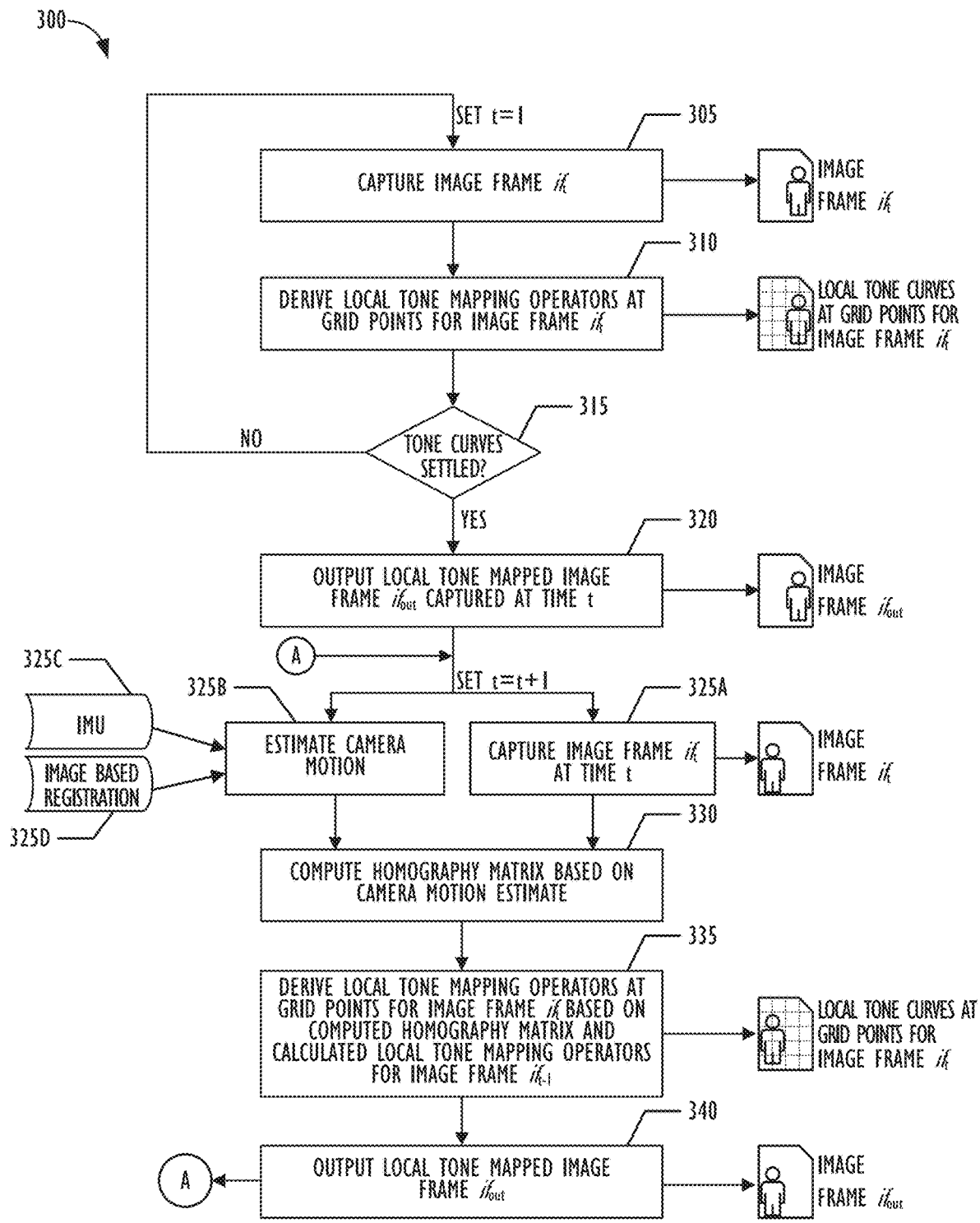
FIG. 3 is a flowchart illustrating an embodiment of a method for performing local tone mapping operations based on camera motion.
Figure 4:
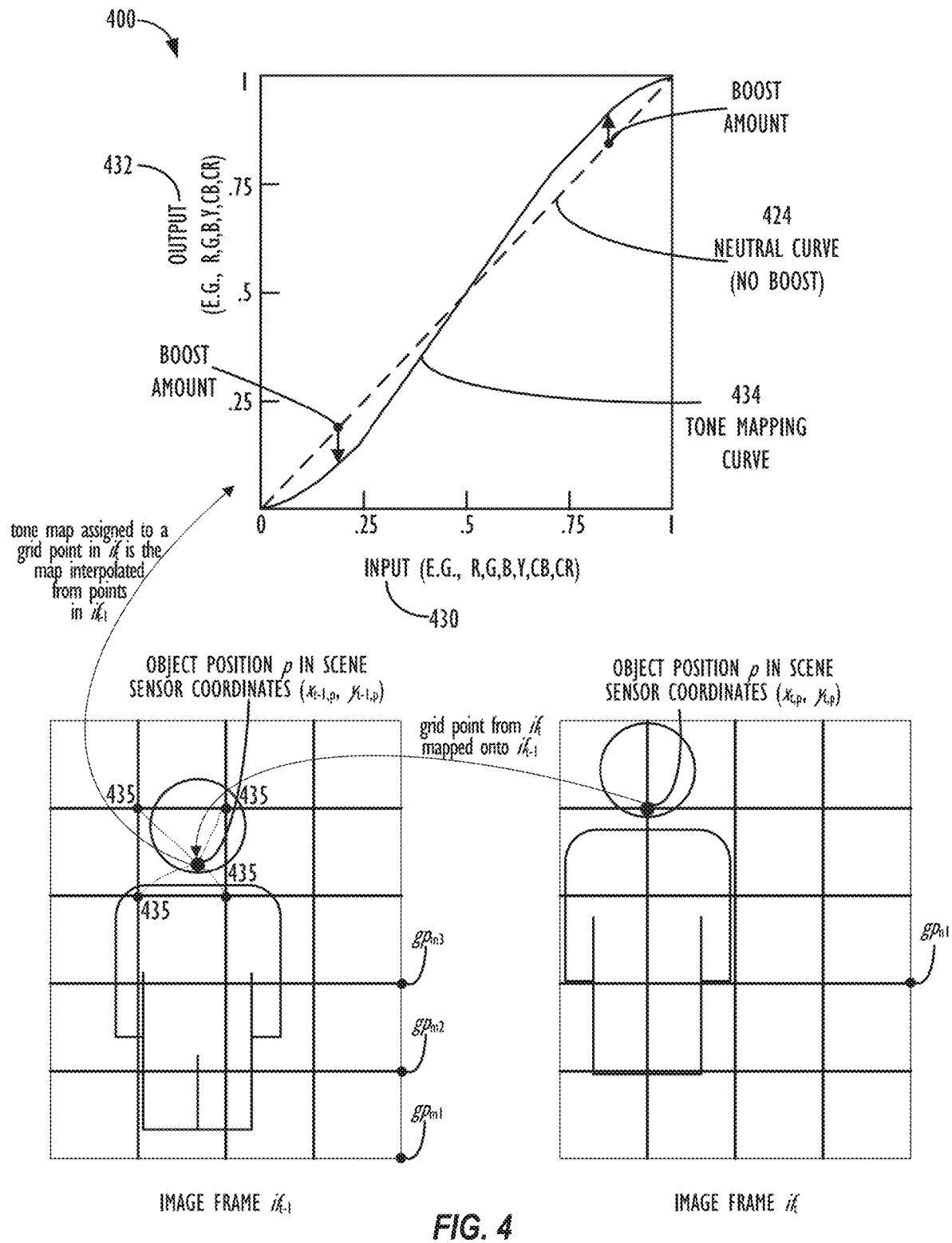
FIG. 4 illustrates assignment of a local tone map curve from one image frame to another image frame based on camera motion, in accordance with one or more embodiments.
Figure 5:
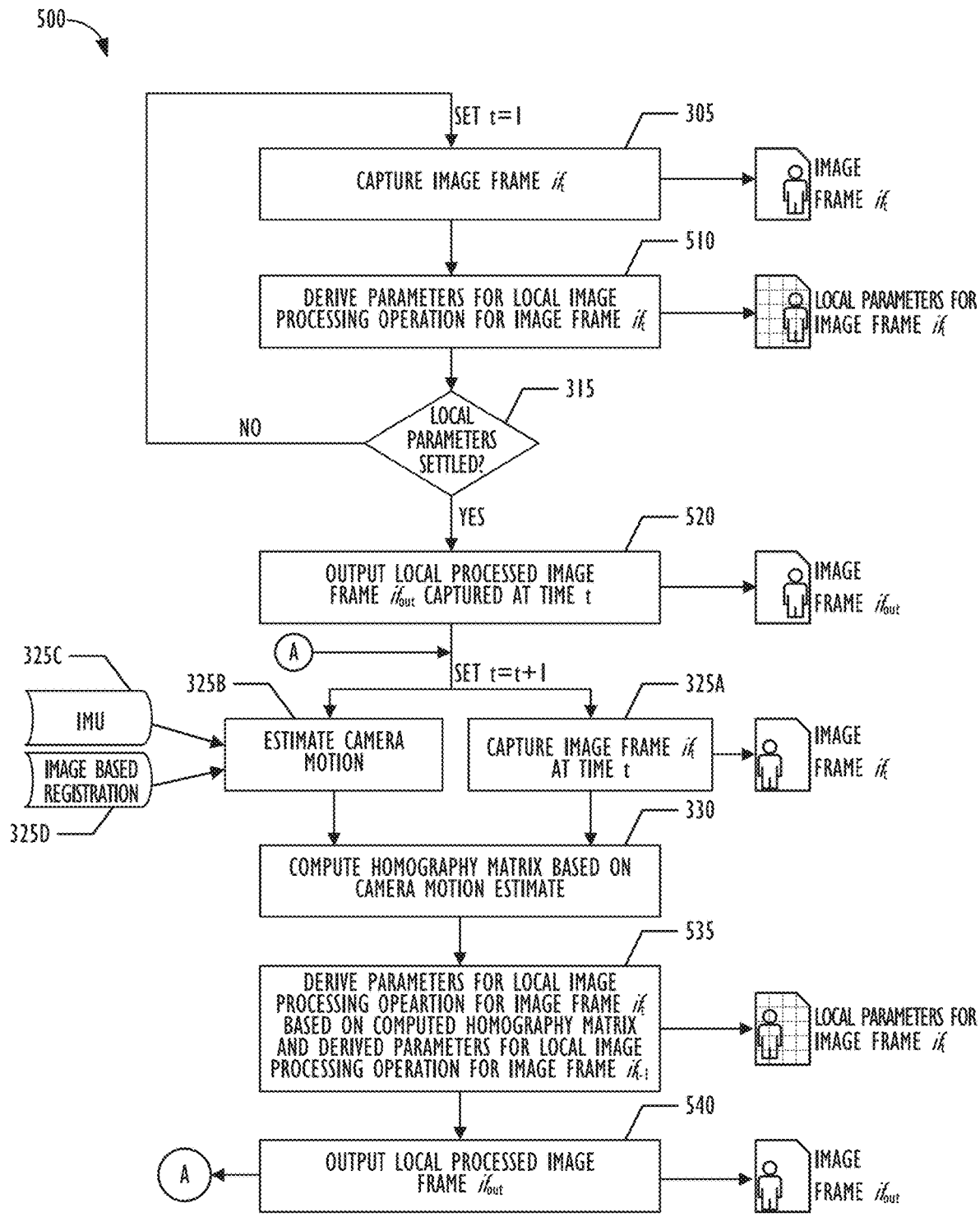
FIG. 5 is a flowchart illustrating another embodiment of a method for performing local image processing operations based on camera motion.

Processor 105 may execute instructions necessary to carry out or control the operation of many functions performed by computer system 100 (e.g., performing the local image processing operations based on camera motion in accordance with FIGS. 3-5). Processor 105 may, for instance, drive display 170 and receive user input from user interface 135. User interface 135 can take a variety of forms, such as a button, keypad, dial, a click wheel, keyboard, display screen and/or a touch screen. Processor 105 may be a system-on-chip such as those found in mobile devices and include one or more dedicated graphics processing units (GPUs). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 perform computational tasks. In one embodiment, graphics hardware 120 may include one or more programmable graphics processing units (GPUs).

Figure 2:
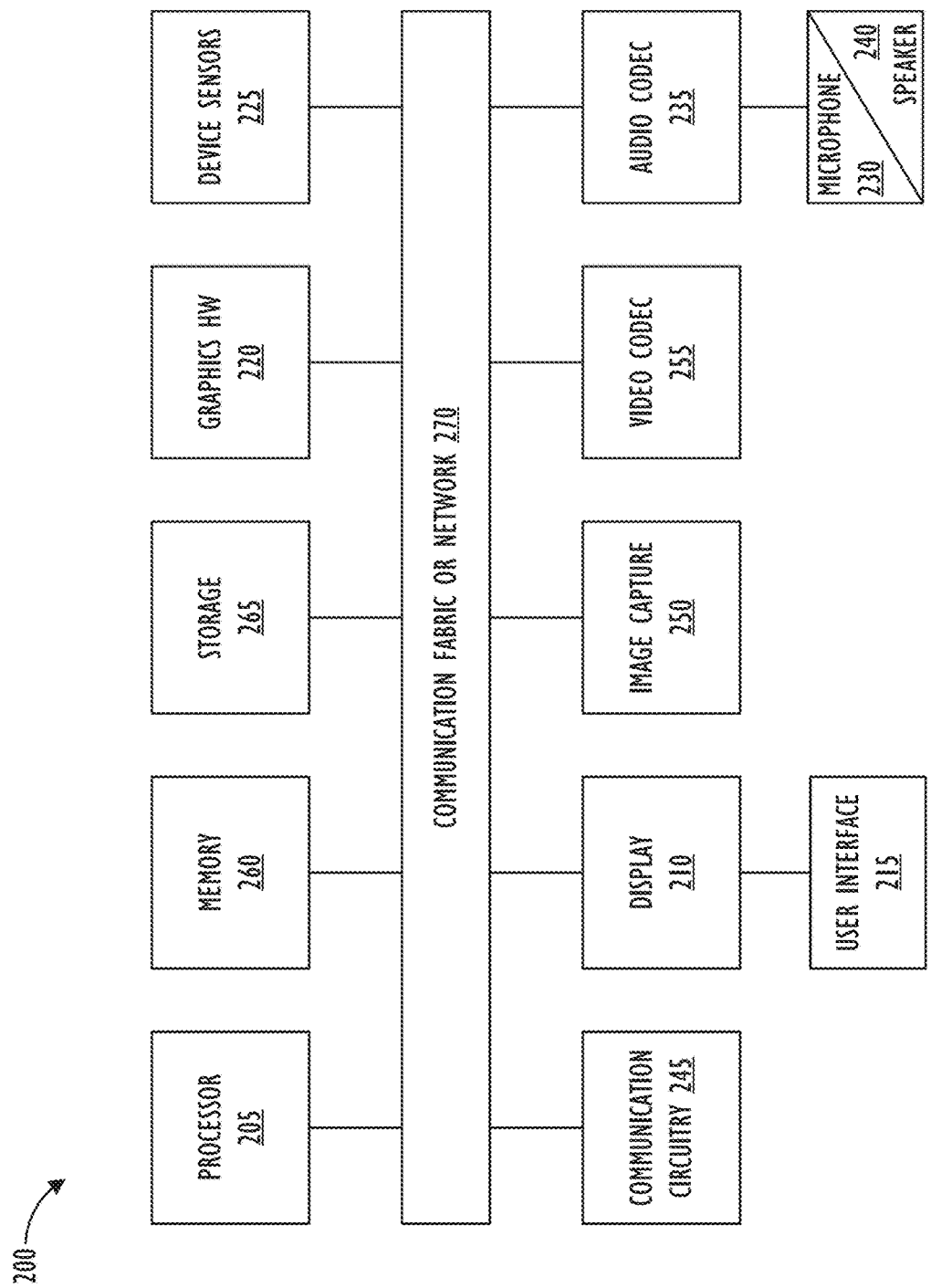
FIG. 2 is a simplified functional block diagram of an illustrative multi-functional electronic device, in accordance with one or more embodiments.

Referring to FIG. 2, a simplified functional block diagram of illustrative electronic device 200 (e.g., electronic image capture device, electronic device, and the like) is shown according to one embodiment. Electronic device 200 could be, for example, a mobile telephone, personal media device, portable camera, a tablet, a notebook, laptop, netbook or desktop computer system. As shown, electronic device 200 may include processor 205, display 210, user interface 215, graphics hardware 220, device sensors 225 (e.g., proximity sensor, ambient light sensor, accelerometer, gyroscope, IMU, magnetometer, and the like), microphone 230, audio codec(s) 235, speaker(s) 240, communications circuitry 445, image capture circuit or unit 250 (e.g., image sensor like a charge coupled device (CCD) or complementary metal oxide semiconductor (CMOS) and related circuitry), video codec(s) 255, memory 260, storage 265, and communications fabric or network bus 270.

Processor 205 may execute instructions necessary to carry out or control the operation of many functions performed by device 200 (e.g., performing the local image processing operations based on camera motion in accordance with FIGS. 3-5). Processor 205 may, for instance, drive display 210 and receive user input from user interface 215. User interface 215 can take a variety of forms, such as a button, keypad, dial, a click wheel, keyboard, display screen and/or a touch screen. Processor 205 and Graphics hardware 220 may be as described above with respect to FIG. 1.

Image capture circuitry 250 may capture image frames at predetermined frame rates that may be processed to generate different types of images including still images, video images, panoramic images, live photo, and the like. Image capture circuitry 250 may also include logic to perform local image processing operations based on image capture device motion in accordance with FIGS. 3-5. Output from image capture circuitry 250 may be processed, at least in part, by video codec(s) 255 and/or processor 205 and/or graphics hardware 220, and/or a dedicated image processing unit incorporated within circuitry 250. Images so captured may be stored in memory 260 and/or storage 265. Memory 260 and storage 265 may be as described above with respect to FIG. 1.

FIG. 3 is a flowchart illustrating an embodiment of method 300 for performing local image processing operations (e.g., local tone mapping operations) based on camera motion. As shown in FIG. 3, method 300 begins at block 305 when an electronic image capture device (e.g., system 100 of FIG. 1, device 200 of FIG. 2, and the like) captures an image frame $if_t$ (e.g., with image capture circuitry 250 of FIG. 2) based on user operation, where t is set to 1. For example, based on user operation to execute an imaging application, the device may begin sequentially capturing image frames to display a preview image on a display (e.g., display 210 of FIG. 2) while waiting for a shutter operation by a user to begin capturing and storing image data based on a selected imaging mode. When displaying the preview image, the device may be configured to capture image frames at a predetermined frame rate (e.g., 30 or 60 frames per second). Subsequently, in response to the shutter operation based on user input, the image capture device may begin capturing a predetermined type of image depending on the selected imaging mode of the device. For example, in response to the shutter operation, the device may capture a still image, a panoramic image generated by stitching or otherwise combining together multiple successively captured still image frames, a video image having a selectively configured frame rate, and the like.

For each captured image frame $if_t$ at block 305, the device may be configured to perform one or more image processing operations (e.g., global and/or local tone mapping). Tone mapping describes how input image intensities are mapped into output image intensities. Tone mapping may be represented as a function $I_{out}=f(I_{in})$. The function $f$ is called a tone curve and is often derived from different characteristics (i.e., statistics) of the image (e.g., local and global, brightness and color histograms, and the like). Tone mapping can be local or global. In global operators, the same function $f$ is applied to all elements (e.g., pixels) in the image frame, while local operators (LTM) use different function $f$ depending on the spatial position of the element (e.g., pixel) in the image frame. A local tone mapping operator can be defined as $I_{out}=f(x, Y, I_{in})$, where (x, y) are pixel coordinates in an image frame.

For example, the device may be configured to derive a global tone mapping operator (e.g., global tone mapping curve) based on image data of a scene captured in the image frame $if_t$ as well as other parameters associated with the device. In addition, the device may be configured to derive one or more local tone mapping operators (e.g., LTM curves) for the image frame $if_t$, e.g., in the form of individual local tone mapping operators for each of a plurality of grid points distributed across the image frame if$_t$, wherein each individual local tone mapping operator may be determined based on the image data of the portion of the scene captured in image frame if$_t$ corresponding to a respective grid point (block 310). LTM curves derived at block 310 may be derived independently, i.e., based only on image data of the image frame if$_t$.

Operations at block 305 and block 310 may be repeatedly performed until the device determines at block 315 that the plurality of LTM curves generated at grid points for (a current, most recently captured) image frame if$_t$ have adapted to the scene captured in image frame if$_t$. For example, at block 315, the device may be configured to compare LTM curves for the current image frame if$_t$ with corresponding LTM curves derived from one or more preceeding frames. More specifically, at block 315 the device may be configured to determine whether a difference between corresponding LTM curves of image frame if$_t$ and one or more image frames that are captured prior to image frame if$_t$ is less than a predetermined threshold amount. An affirmative determination at block 315 (YES at block 315) may simply require a threshold number of LTM curves of image frame if$_t$ being "settled" relative to corresponding LTM curves from one or more prior frames. Alternately, image frame if$_t$ may be divided into multiple regions and an affirmative determination at block 315 (YES at block 315) may require corresponding one or more LTM curves from each region being "settled" relative to corresponding LTM curves from one or more prior frames. Thus, by repeatedly performing the operations of blocks 305-315 during preview mode, the device waits until the local tone curves derived from current image frame if$_t$ have settled sufficiently (i.e., fluctuations in a sufficient number of consecutively determined corresponding local tone mapping curves have diminished to a desired extent), such that the operations of method 300 may proceed.

In response to determining at block 315 that the LTM curves have not settled (NO at block 315), the device may be configured to stay in preview mode by, e.g., disabling operation of a shutter button, preventing use of camera motion estimation data for image processing according to method 300, continuing to sequentially capture and display image frames at block 305, and calculating corresponding LTM curves at grid points for the sequentially captured image frames at block 310. On the other hand, in response to determining at block 315 that the LTM curves have settled (YES at block 315), the device may be configured to perform predetermined operations. For example, the device may be configured to enable operation of a shutter button by a user, and start deriving camera motion based on combining data received from the IMU with one or more relevant camera calibration parameters. In other words, when the user executes the imaging application on the device and the device starts displaying image data based on sequentially captured image frames at block 305 in preview mode, the device may prevent (e.g., by disabling operation of a shutter button) the user from operating the shutter button to capture an image (e.g., start capturing a panoramic image, start capturing video, and the like) until device detects at block 315 that the temporal frame-to-frame difference between consecutive curves of consecutive image frames has become very small (e.g., less than a predetermined threshold).

In response to determining at block 315 that the LTM curves have settled (YES at block 315), and in response to detection of a predetermined operation signaling start of image capture in a predetermined mode (e.g., operation of a shutter button to start capturing image frames to be stitched or otherwise combined together to generate a panorama, operation to start recording a video, and the like), method 300 proceeds to block 320 where LTM curves derived at grid points for current image frame if$_t$ that is captured at time t are applied to the image frame if$_t$ to generate local tone mapped image frame if$_{out}$. When image frame if$_t$ is a first frame for an image capture operation (e.g., after operation of a start button), tone curves for image frame if$_t$ may be derived exclusively based on image data of image frame if$_t$, i.e., in isolation and without tone curve re-use from (i.e., independently of) any previous image frames. Alternately, or in addition, tone curves for image frame if$_t$ may be derived based on cached data (e.g., camera use data, mode data, and the like).

Method 300 then sets t=t+1, and proceeds to block 325A where the device captures a subsequent image frame, if$_t$, at time t. Image frame if$_t$ may be an image frame that is captured by the device immediately after capturing image frame if$_{t-1}$ at time t−1. Alternately, one or more intermediate image frames may have been captured by the device between image frames if$_{t-1}$ and if$_t$, and image frame if$_t$ captured at time t may be selected for further processing in block 325A based on predetermined conditions (e.g., elapse of predetermined time, difference between image frames if$_{t-1}$ and if$_t$ satisfying predetermined thresholds or conditions, contents of one or more of image frames if$_{t-1}$ and if$_t$ satisfying predetermined conditions, and the like). In other words, image frames if$_{t-1}$ and if$_t$ may, or may not, be consecutively captured image frames.

One problem of applying (image frame-specific) local tone mapping operators when performing image processing operations on successively-captured image frames to generate a combined image (e.g., panoramic image, video image, live photo, and the like) is the temporal instability of the tone curves caused by even small camera motions. For example, when capturing a panoramic or video image, as the camera moves or pans (or in case of internal scene motion), image composition in the viewfinder changes, and hence, the local tone curves derived from the sequentially captured image frames at those time instances will also vary for each image frame, even for the same object in the scene. In the case of a panoramic image, this can lead to the situation where approximately the same part (e.g., object in a scene) of the combined panoramic image has one type of tone mapping curve applied in a region corresponding to one frame, and a very different tone mapping curve applied in an adjacent region corresponding to a following frame. More specifically, in method 300 of FIG. 3, an LTM curve applied to image frame if$_{t-1}$ captured at time t−1 may be a local tone mapping curve defined by a function $I_{out}=f_{t-1}(x_{t-1}, y_{t-1}, I_{in})$, where $(x_{t-1}, y_{t-1})$ are pixel coordinates in image frame if$_{t-1}$ captured at time t−1. And a LTM curve applied to subsequent frame if$_t$ captured at time t may be a local tone mapping curve defined by a function $I_{out}=f_t(x_t, y_t, I_{in})$, for the pixel coordinate position $(x_t, y_t)$ which is in image frame if$_t$ captured at time t and which corresponds to pixel coordinates $(x_{t-1}, y_{t-1})$ in image frame if$_{t-1}$ captured at time t−1 (i.e., corresponds to the same object in the captured scene). In this case, LTM curves defined by functions $f_{t-1}$ and $f_t$ may be significantly different, thereby causing visual artifacts such as flicker or banding in a final combined image (e.g., panorama, video, and the like).

To overcome this problem, at block 325B of method 300 of FIG. 3, the device determines a motion of the camera, such that the method may attempt to re-use LTM curves for the same objects or portions of the scene across subsequently-captured image frames, no matter where the objects may move to in the scene with respect to the capturing camera's image sensor. In one embodiment, the device may use data from one or more sensors (e.g., IMU 325C) to estimate motion of the device between time t−1 when image frame if$_{t-1}$ is captured and time t when image frame if$_t$ is captured. IMU 325C may be configured to sense motion (e.g., rotation, translation, and the like) about each of the device's six-degrees of freedom (surge, sway, heave, yaw, pitch and roll) to calculate displacement (e.g., movement information) of the device between time t−1 when image frame if$_{t-1}$ is captured and time t when image frame if$_t$ is captured. For example, IMU 325C may output information regarding a frame-to-frame change in the orientation and/or translation of the camera. This information may be utilized based on known techniques to determine how to transform one set of image pixels of an image frame to the same pixels in a subsequently captured image frame. In another embodiment, the device may alternately or additionally use image-based (image-to-image) registration techniques (e.g., image feature computation, random sample consensus (RANSAC), and the like) to derive device motion and calculate displacement of the device between times t$_1$ and t$_2$ (e.g., determine how much and where a point in a scene projected onto particular sensor coordinates in a first image frame has moved, when said point in the scene is projected onto different sensor coordinates in a second image frame).

The camera motion estimated at block 325B provides a function that describes how a position of a scene point projection onto the image sensor of the device changes between image frame if$_{t-1}$ and image frame if$_t$. This is explained in further detail in connection with FIG. 4.

FIG. 4 illustrates how an LTM curve for a point p in a scene captured in image frame if$_t$ is derived based on the LTM curve for the corresponding point p in a scene captured in image frame if$_{t-1}$. As shown in FIG. 4, in image frame if$_{t-1}$, point p in the scene is projected onto sensor coordinates $(x_{t-1,p}, y_{t-1,p})$. When a subsequent frame if$_t$ is captured at time t, that same point p is projected onto sensor coordinates $(x_{t,p}, y_{t,p})$. In general, due to camera motion, these sensor coordinates will not be the same, but these coordinates are related by a function h that can be computed based on the camera motion estimate determined at block 325B of FIG. 3. This function h relates the above sensor coordinates for image frames if$_{t-1}$ and if$_t$ respectively captured at times t−1 and t, as follows:

$$(x_{t,p}, y_{t,p}) = h((x_{t-1,p}, y_{t-1,p})) \text{ or inversely}$$

$$(x_{t-1,p}, y_{t-1,p}) = h^{-1}((x_{t,p}, y_{t,p})) \qquad \text{Eq. (1)}$$

The function h may be expressed as a matrix multiplication applied to homogeneous coordinates. The matrix, called a homography matrix, can be derived (block 330 in FIG. 3) directly using image-based registration techniques (e.g., image feature computation, RANSAC, and the like) 325D, or by combining IMU 325C data (e.g., movement information) with camera calibration parameters of the device.

To estimate camera motion at block 325B and consequently, compute the function h expressed as a homography matrix in block 330, various techniques can be employed. For example, the device implementing method 300 may be configured to simply utilize data from IMU 325C regarding rotation at an imaging lens of the device between times t$_1$ and t$_2$. When utilizing IMU 325C data, the device may calculate the homography matrix at block 330 without actually using image data of image frames if$_{t-1}$ and if$_t$ to determine what the image-to-image translation and rotation is between the frames. However, if IMU 325C reports data that does not meet predetermined conditions (e.g., reliability of read-out data below predetermined threshold, read-out data accuracy does not meet predetermined criteria, read-out data indicating little or no motion, and the like), the device implementing method 300 may be configured to fall back on utilizing image based registration 325D techniques where image data of image frames if$_{t-1}$ and if$_t$ may be analyzed to determine the image-to-image translation and rotation (e.g., orientation). In another embodiment, both IMU 325C and image-based registration 325D may be utilized to increase accuracy of the computer homography matrix calculated at block 330. In one embodiment, since image-based registration 325D techniques may fail more often and/or be computationally more expensive than utilizing IMU 325C, camera motion estimation at block 325B based on IMU 325C read-out data may be preferable to determine transformation between image frames. In another embodiment, where there is internal scene motion (e.g., moving object in scene), camera motion estimation at block 325B based on IMU 325C read-out may fail. In this case, it may be desirable to use image-based registration 325D to determine transformation between image frames.

Method 300 then moves to block 335, where the device may derive LTM curves at the sensor grid points for image frame if$_t$ based on the computed homography matrix and the calculated (e.g., independently and exclusively derived) LTM curves at the sensor grid points for image frame if$_{t-1}$. In effect, with method 300, the device relates each LTM operator with object positions (or expected object positions, based on estimated device motion) in the scene rather than the position on the sensor they are mapped onto. As a result, a particular portion (e.g., object) of the scene may be tone mapped the same way in each image frame, irrespective of where the portion or object falls onto the sensor grid. For example, consider again image frame if$_{t-1}$ captured at time t−1, and a tone map for sensor coordinates $(x_{t-1}, y_{t-1})$ in image frame if$_{t-1}$: $I_{out} = f_{t-1}(x_{t-1}, y_{t-1}, I_{in})$ Here, when a subsequent frame if$_t$ is captured at time t, and when sensor coordinates of frame if$_t$ are determined based on the camera motion estimate to be related to sensor coordinates of image frame if$_{t-1}$ captured at time t−1 through the mapping function $(x_{t-1}, y_{t-1}) = h^{-1}((x_t, y_t))$, a scene-referred tone map may satisfy the following equation:

$$f_{t-1}(x_{t-1}, y_{t-1}, I_{in}) = f_t(h^{-1}((x_t, y_t)), I_{in}) \qquad \text{Eq. (2)}$$

According to Equation (2), a tone map operator (which may be derived via interpolation) for a given sensor coordinate (e.g., portion) in frame if$_{t-1}$ is copied from frame if$_{t-1}$, and is assigned to a corresponding sensor coordinate (e.g., portion) in frame if$_t$, based on the homography matrix and underlying function h. In other words, instead of independently deriving a new tone mapping curve for given sensor coordinates (x, y) for image frame if$_t$ based on corresponding image data of the scene captured in image frame if$_t$, the tone mapping curve for corresponding sensor coordinates from preceding image frame if$_{t-1}$ determined to correspond to the given sensor coordinates for image frame if$_t$ is copied and assigned as the LTM operator for the given sensor coordinates for image frame if$_t$.

In one embodiment, to avoid unnecessary image processing, the new tone mapping curve for the given sensor coordinates for image frame if$_t$ may not be calculated (exclusively derived) based on corresponding image data of the scene captured in image frame if$_t$. Instead, a corresponding LTM curve from the tone mapping data of the earlier image frame may simply be re-used. In another embodiment, the new tone mapping curve for the given sensor coordinates for image frame $if_t$ may be calculated (exclusively derived) based on the corresponding image data of the scene captured in image frame $if_t$. This new curve (or corresponding underlying image statistics (e.g., histogram)) may then be blended with the corresponding LTM curve (or underlying image statistics (e.g., histogram)) from the earlier image frame to derive a final blended LTM curve to be applied to image data at the corresponding given sensor coordinates (or portion) of the image frame $if_t$. The blending of the old and new curves (or corresponding image statistics) may be performed according to any desired criteria (e.g., particular weighting factor). Thus, local tone maps derived for image frame $if_t$ can be copied over (e.g., replace) from local tone maps for image frame $if_{t-1}$, or can be a weighted sum (e.g., average) of curves from the local tone maps for image frame $if_{t-1}$, and an independent set of one or more curves derived uniquely for image frame $if_t$. Tone maps for sensor coordinates other than those on the grid may be calculated using interpolation (e.g., bilinear, trilinear, multi-linear, and the like) techniques.

In some embodiments, an updated homography matrix at step 330 and new LTM operators at block 335 are not necessarily computed for every subsequently captured image frame. Instead, one or more intermediate image frames may be captured, which intermediate frames may, e.g., simply continue to re-use the LTM operators calculated for the preceding frame instead of deriving new LTM operators. In such embodiments, when predetermined conditions have been met, an updated homography matrix may again be computed at 330, based on the motion of the camera since the last non-intermediate frame was captured, and new LTM operators may be derived based on image data of the new image frame.

In one embodiment, LTM curves derived at block 310 for the sensor grid coordinates for image frame $if_{t-1}$ may be maintained in a buffer. This buffer may then be updated at block 335 to store the LTM curves for the sensor grid coordinates for image frame $if_t$ that are derived based on the previously stored LTM curves for sensor grid coordinates for image frame $if_{t-1}$ and based on the determined camera motion estimate and the computed homography matrix. After updating at block 335, contents (i.e., LTM curves) of the buffer may become the baseline when deriving tone curves for the next image frame $if_t$ captured at block 325A in the next iteration.

In addition to re-using LTM curves from the previous image frame, LTM curves for new objects of the scene that come within the field of view and are captured in image frame $if_t$ as the camera is being panned may be independently derived using image data image frame $if_t$ in the same manner as described in connection with block 310. For example, when deriving LTM curves for sensor grid coordinates for image frame $if_t$ at block 335 and updating the buffer based on LTM curves for the sensor grid coordinates for image frame $if_{t-1}$, a subset of the sensor grid coordinates for image frame $if_t$ may correspond to a new portion or region of the visual field that was not captured in the previous image frame $if_{t-1}$. In one embodiment, at block 335, the device may be configured to independently derive LTM curves for the subset of the sensor grid coordinates based on image data of corresponding portions of the scene captured in image frame $if_t$ (similar to processing at block 310). Alternately, or in addition, at block 335, the device may be configured to derive LTM curves for the subset of the sensor grid coordinates based on corresponding derived one or more LTM curves at sensor grid points for image frame $if_{t-1}$ where the region of the scene in closest proximity to the new portion is projected.

For example, as shown in FIG. 4, LTM curve for sensor coordinates defined by grid point $gp_{n1}$ for image frame $if_t$ captured at time t image may be derived independently based on corresponding image data of the corresponding portion of the scene captured in image frame $if_t$. Alternately, or in addition, the LTM curve for sensor coordinates (or portion) defined by grid point $gp_{n1}$ for image frame $if_t$ captured at time t may be derived by extrapolating from the tone curves for one or more of the sensor coordinates defined by grid points $gp_{m1}$, $gp_{m2}$, and $gp_{m3}$, for image frame $if_{t-1}$ captured at time t−1. In other words, when the transformation function h maps into points that are outside of image frame $if_{t-1}$, bilinear interpolation is not possible. In this case, extrapolation can be used as explained above. In addition, this case can also act as a trigger to calculate and use curves derived exclusively from image frame $if_t$ captured at time t. In yet another embodiment, some combination or blending of the derivation based on the corresponding new image data and the extrapolation based on old tone curves may be used to derive the LTM curve for grid point $gp_{n1}$.

Although the embodiments shown in FIGS. 3 and 4 show that the grid of points over each image frame for which the LTM curves are determined are a fixed finite number of discrete coordinates over the image sensor and are arranged in a grid that is fixed with respect to the image sensor, this may not necessarily be the case. For example, in an alternate embodiment, locations of the LTM grid points for which the LTM curves are derived at block 335 may move (shift) for each subsequent image frame based on the determined camera motion estimate and the computed homography matrix. Tone maps for sensor coordinates in the subsequent image frame other than those on the moved grid may then be calculated using interpolation (e.g., bilinear, trilinear, multi-linear, and the like) techniques. This approach of shifting or moving locations of the grid points based on camera motion estimate may improve temporal stability of the image processing operation and may result in reduced interpolation processing.

Instead of utilizing a single earlier prior image frame, LTM curves may be derived at block 335 for sensor grid coordinates based on corresponding LTM curves from more than one earlier image frame. For example, tone curves at sensor grid points may be buffered for three previous image frames $if_{t-1}$, $if_{t-2}$, and $if_{t-3}$, and the new tone mapping curve for the given sensor coordinates for image frame $if_t$ may be derived based on the corresponding LTM curves from one or more of the earlier image frames $if_{t-1}$, $if_{t-2}$, and $if_{t-3}$, using a blending operation or a replacing operation. For example, for a first image frame $if_t$ captured at time t, LTM curves may be derived for sensor grid coordinates exclusively based on image data of image frame $if_t$. Subsequently, for image frame $if_{t+1}$ captured at time t+1, LTM curves for sensor grid coordinates may be derived by blending corresponding LTM curves or statistics (determined based on motion estimation) obtained for image frame $if_t$ with LTM curves obtained exclusively based on image data of image frame $if_{t+1}$ captured at time t+1. Alternately, for image frame $if_{t+1}$ captured at time t+1, LTM curves for sensor grid coordinates may be derived based only on corresponding LTM curves (determined based on motion estimation) obtained for image frame $if_t$. Thereafter, for image frame $if_{t+2}$, LTM curves for sensor grid coordinates may be derived by blending corresponding LTM curves or statistics (determined based on motion estimation) for image frame $if_t$ captured at time t and image frame $if_{t+1}$ captured at time t+1 with LTM curves obtained exclusively based on image data of image frame $if_{t+2}$ captured at time t+2. Alternately, for image frame $if_{t+2}$ captured at time t+2, LTM curves for sensor grid coordinates may be derived based on corresponding LTM curves (determined based on motion estimation) for image frame $if_t$ captured at time t and image frame $if_{t+1}$ captured at time t+1, where the corresponding LTM curves in the two or more prior image frames are respectively derived exclusively based on image data of the corresponding image frame.

In one embodiment, the local tone mapping curves for the sensor grid points may be defined as a set of look-up tables at a finite number of discrete coordinates on the image sensor, and arranged in a grid. As shown in FIG. 4, tone maps for pixel positions (and corresponding sensor coordinates) that are not grid points may be derived through interpolation (e.g., bilinear, trilinear, multi-linear, and the like) of the known tone maps at the grid points. To achieve scene referred local tone mapping, in one embodiment, the tone map look-up table at sensor coordinates $(x_{t-1}, y_{t-1})$ for image frame $if_{t-1}$ captured at time t−1, and having the relationship $(x_{t-1}, y_{t-1}) = h^1((x_t, y_t))$ with sensor coordinates $(x_t, y_t)$ for image frame $if_t$ captured at time t, may be copied from frame $if_{t-1}$ and assigned to grid point $(x_t, y_t)$ for image frame $if_t$. Alternately, the tone map look-up table at sensor coordinates $(x_{t-1}, y_{t-1})$ image frame $if_{t-1}$ may be blended with the tone map look-up table derived independently at sensor coordinates $(x_t, y_t)$ for image frame $if_t$.

As shown in FIG. 4, the tone map assigned to a grid point corresponding to object position p in image frame $if_t$ is a map interpolated from corresponding points (e.g., four neighboring grid points 435) in image frame $if_{t-1}$. Reference numeral 434 represents an exemplary tone mapping curve that may be applied to the interpolated point or portion of image frame $if_{t-1}$ and then re-used in the corresponding point or portion of image frame $if_t$. Tone mapping curve 434 may be defined so that along the x-axis 430 of the graph is the input value of some component of the input signal (e.g., luminance), normalized to a range of 0 to 1, with 0 representing the darkest pixels (i.e., black) and 1 representing the brightest pixels (i.e., white). Along the y-axis 432 of the graph is the output value of the same component of the input signal (e.g., luminance) that the image data will be mapped to, again normalized to a range of 0 to 1, with 0 representing the darkest pixels and 1 representing the brightest pixels. Applying a tone mapping curve separately to each component of a signal typically causes an increase in contrast and color saturation. Neutral curve 424 represents a tone curve that would provide no boost to the input image. In other words, neutral curve 424 has a linear slope of 1. For example, pixels with a relative luminance value of 0.25 would stay at 0.25 in the output image; pixels with a relative luminance value of 0.75 would stay at 0.75 in the output image, and so forth for any input luminance value. Neutral curve 424 is shown on the graph to give a reference for how much boosting tone mapping curve 434 provides in the various luminance input regions.

Size of the grid and the number of discrete coordinates arranged on the image sensor for which LTM curves are derived (or copied and re-used) for each image frame is not limited to that shown in FIG. 4. Any number of discrete coordinates may be provided depending on the desired level of accuracy, processing speed, available resources, and other characteristics of the device. Also, the discrete coordinates for which the LTM curves are calculated need not be arranged in a grid. The discrete coordinates for which the LTM curves are calculated may be arranged in any suitable arrangement. Tone mapping may be smoothly applied over the image frame.

Returning to FIG. 3, after LTM curves for sensor grid points have all been derived for image frame $if_t$ at block 335, method 300 proceeds to block 340 where LTM curves derived at grid points for current image frame $if_t$ that is captured at time t are applied to the image frame $if_t$ to generate local tone mapped image frame $if_{out}$. Here, since image frame $if_t$ is a second (or subsequent) frame for an image capture operation, the local tone mapping curves for image frame $if_t$ are derived by reusing the local tone curves from the corresponding portions of one or more previous image frames, thereby reducing appearance of visual artifacts in a final produced image. Operations of blocks 325A-340 are subsequently repeated for additional image frames until a predetermined operation by the user (e.g., operation of shutter button to signal end of image capturing operation), or until when a predetermined condition is satisfied (e.g., elapse of a predetermined period of time, end of a panorama capture sequence). In case the method 300 of FIG. 3 is executed for recording a panoramic image, image frame $if_{out}$ capture at time t−1 and image frame $if_{out}$ captured at time t (and subsequently captured image frames) may be stitched together using known panorama image generation techniques to generate a panorama image. Similarly, in case method 300 of FIG. 3 is executed for recording a video image, image frame $if_{out}$ capture at time t−1 and image frame $if_{out}$ captured at time t (and subsequently captured image frames) are combined using known video image generation techniques to generate and store a video.

Although FIG. 3 illustrates that the blocks (other than blocks 325A-B) of method 300 are implemented in a sequential operation, other embodiments of method 300 may have two or more blocks implemented in parallel operations. Further, in one or more embodiments, not all blocks may need to be implemented and/or, other, alternative or additional blocks may be executed.

Although FIGS. 3 and 4 describe deriving and re-using LTM curves for subsequent image frames based on camera motion estimates, the techniques disclosed in FIGS. 3 and 4 can also be applied for performing other types of local image processing operations for image frames based on camera motion estimate and based on an independent set of parameters for the local image processing operation derived uniquely for at least a first image frame. FIG. 5 is a flowchart illustrating an embodiment of method 500 for performing other local image processing operations like local color correction, local noise filtering, local object based denoising or optimizing, and the like, based on camera motion. Method 500 of FIG. 5 contains operation blocks similar to those described above with respect to method 300 of FIG. 3. These operation blocks are labeled identically, and their description is omitted here for brevity.

As shown in FIG. 5, at block 510, parameters for local image processing operation for image frame $if_{t-1}$ may be derived. For example, similar to LTM curves for image frame $if_{t-1}$ in method 300, an independent set of parameters for the local image processing operation may be derived uniquely for first image frame $if_{t-1}$ so that the parameters for local image processing operation for image frame $if_{t-1}$ are derived in isolation and without parameter re-use from any previous image frame.

Subsequently, at block 520, local parameters derived for current image frame $if_{t-1}$ that is captured at time t−1 are applied to the image frame $if_{t-1}$ to generate local processed image frame $if_{out}$ captured at time t−1. Since image frame if$_{t-1}$ is a first frame for an image capture operation, local parameters for image frame if$_{t-1}$ may be derived in isolation and without parameter re-use from previous image frames. Alternately, or in addition, tone curves for image frame if$_{t-1}$ may be derived based on cached data. At block 535, the device may derive parameters (e.g., local image processing mapping functions, $f$) for image frame if$_t$ based on the computed homography matrix and the calculated parameters for image frame if$_{t-1}$. In effect, with method 500 (similar to method 300 of FIG. 3), the device relates each local parameter with object positions (or expected object positions, based on estimated device motion) in the scene, rather than the position on the sensor they are mapped onto. As a result, a particular portion (e.g., object) of the scene may be processed the same way in each image frame, irrespective of where the portion or object falls onto the sensor grid. That is, the same parameter of the local image processing operation may be applied to a particular part of the visual field in each of multiple image frames sequentially captured. After local parameters for sensor grid points have all been derived for image frame if$_t$ at block 535, method 500 proceeds to block 540 where the local parameters derived at grid points for current image frame if$_t$ that is captured at time t are applied to the image frame if$_t$ to generate local processed image frame if$_{out}$. Here, since image frame if$_t$ is a second (or subsequent) frame for an image capture operation, local parameters for image frame if$_t$ are derived by parameter re-use from previous image frames, thereby reducing appearance of visual artifacts in a final produced image. Some of the parameters for new image regions may be independently derived in image frame if$_t$ based on corresponding image data, as explained previously in connection with method 300.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or another smart device).

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, than presented herein. More generally, if there is hardware support some operations described in conjunction with FIGS. 1-5 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An image processing method comprising:
   capturing, with an electronic image capture device, a first image of a scene at a first time;
   determining a first local tone mapping operator for a first portion of the first image;
   capturing, with the electronic image capture device, a second image of the scene at a second time;
   determining a motion of the electronic image capture device between the first time and the second time;
   determining a second local tone mapping operator for a second portion of the second image, wherein the second portion is determined to correspond to the first portion based, at least in part, on the determined motion of the electronic image capture device, and wherein the second local tone mapping operator is determined based, at least in part, on the first local tone mapping operator; and
   applying at least the second local tone mapping operator to the second portion of the second image to local tone map the second image.

2. The image processing method according to claim 1, further comprising:
   applying at least the first local tone mapping operator to the first portion of the first image to local tone map the first image; and
   combining the first and second images to generate a panoramic image.

3. The image processing method according to claim 1, wherein determining the motion of the electronic image capture device comprises:
   determining at least one of an orientation and a translation of the electronic image capture device between the first time and the second time.

4. The image processing method according to claim 1, wherein determining the motion of the electronic image capture device comprises:
   operating, between the first time and the second time, an inertial measurement unit (IMU) disposed in the electronic image capture device to obtain movement information; and
   determining the motion based on the obtained movement information and one or more calibration parameters for the electronic image capture device.

5. The image processing method according to claim 1, wherein the second local tone mapping operator is the same as the first local tone mapping operator.

6. The image processing method according to claim 1, further comprising:
   determining a third local tone mapping operator for the second portion of the second image, wherein the third local tone mapping operator is derived exclusively from image data of the second image, and wherein the second local tone mapping operator is determined based on both the first local tone mapping operator and the third local tone mapping operator.

7. The image processing method according to claim 1, wherein determining the motion of the electronic image capture device comprises performing image-to-image registration between the first image and the second image.

8. The image processing method according to claim 1, further comprising:
interpolating a plurality of local tone mapping operators respectively corresponding to grid points of the first image to determine the second local tone mapping operator for the second portion of the second image.

9. The image processing method according to claim 1, further comprising:
determining a plurality of first local tone mapping operators respectively corresponding to a first grid of points over the first image; and
determining a plurality of second local tone mapping operators respectively corresponding to a second grid of points over the second image,
wherein locations of the second grid points over the second image are based, at least in part, on the determined motion of the electronic image capture device, and
wherein at least one of the plurality of second local tone mapping operators comprises the determined second local tone mapping operator.

10. An image processing device comprising:
an image sensor;
memory; and
one or more processors operatively coupled to the image sensor and the memory, wherein the memory comprises instructions that, when executed by the one or more processors, cause the one or more processors to:
capture, with the image sensor, a first image of a scene at a first time;
determine a first local tone mapping operator for a first portion of the first image;
capture, with the image sensor, a second image of the scene at a second time;
determine a motion of the image sensor between the first time and the second time;
determine a second local tone mapping operator for a second portion of the second image, wherein the second portion is determined to correspond to the first portion based, at least in part, on the determined motion of the image sensor, and wherein the second local tone mapping operator is determined based, at least in part, on the first local tone mapping operator; and
apply at least the second local tone mapping operator to the second portion of the second image to local tone map the second image.

11. The image processing device according to claim 10, wherein the memory further comprises instructions that, when executed by the one or more processors, cause the one or more processors to:
apply at least the first local tone mapping operator to the first portion of the first image to local tone map the first image; and
combine the first and second images to generate a panoramic image.

12. The image processing device according to claim 10, wherein the instructions that cause the one or more processors to determine the motion of the image sensor comprise instructions that, when executed by the one or more processors, cause the one or more processors to:
determine at least one of an orientation and a translation of the image sensor between the first time and the second time.

13. The image processing device according to claim 10, wherein the instructions that cause the one or more processors to determine the motion of the image sensor comprise instructions that, when executed by the one or more processors, cause the one or more processors to:
operate, between the first time and the second time, an inertial measurement unit (IMU) disposed in the image processing device to obtain movement information; and
determine the motion based on the obtained movement information and one or more calibration parameters for the image sensor.

14. The image processing device according to claim 10, wherein the second local tone mapping operator is the same as the first local tone mapping operator.

15. The image processing device according to claim 10, wherein the memory further comprises instructions that, when executed by the one or more processors, cause the one or more processors to:
determine a third local tone mapping operator for the second portion of the second image, wherein the third local tone mapping operator is derived exclusively from image data of the second image, and wherein the second local tone mapping operator is determined based on both the first local tone mapping operator and the third local tone mapping operator.

16. The image processing device according to claim 10, wherein the instructions that cause the one or more processors to determine the motion of the image sensor comprise instructions that, when executed by the one or more processors, cause the one or more processors to perform image-to-image registration between the first image and the second image.

17. The image processing device according to claim 10, wherein the memory further comprises instructions that, when executed by the one or more processors, cause the one or more processors to:
interpolate a plurality of local tone mapping operators respectively corresponding to grid points of the first image to determine the second local tone mapping operator for the second portion of the second image.

18. The image processing device according to claim 10, wherein the memory further comprises instructions that, when executed by the one or more processors, cause the one or more processors to:
determine a plurality of first local tone mapping operators respectively corresponding to a first grid of points over the first image; and
determine a plurality of second local tone mapping operators respectively corresponding to a second grid of points over the second image,
wherein locations of the second grid points over the second image are based, at least in part, on the determined motion of the image sensor, and
wherein at least one of the plurality of second local tone mapping operators comprises the determined second local tone mapping operator.

19. An image processing method comprising:
capturing, with an electronic image capture device, a first image of a scene at a first time;
determining a first parameter for a local image processing operation for a first portion of the first image;
capturing, with the electronic image capture device, a second image of the scene at a second time;

determining a motion of the electronic image capture device between the first time and the second time;

determining a second parameter for the local image processing operation for a second portion of the second image, wherein the second portion is determined to correspond to the first portion based, at least in part, on the determined motion of the electronic image capture device, and wherein the second parameter is determined based, at least in part, on the first parameter; and applying at least the second parameter to the second portion of the second image to perform the local image processing operation for the second image.

20. The image processing method according to claim 19, wherein the local image processing operation comprises at least one of a local color correction operation, a local noise filtering operation, and a local object based denoising or optimizing operation.

21. The image processing method according to claim 19, wherein the second parameter is the same as the first parameter.

22. The image processing method according to claim 19, further comprising:

determining a third parameter for the local image processing operation for the second portion of the second image, wherein the third parameter is derived exclusively from image data of the second image, and wherein the second parameter is determined based on both the first parameter and the third parameter.

23. The image processing method according to claim 19, further comprising:

determining a plurality of first parameters for the local image processing operation and respectively corresponding to a first grid of points over the first image; and determining a plurality of second parameters for the local image processing operation and respectively corresponding to a second grid of points over the second image, wherein locations of the second grid points over the second image are based, at least in part, on the determined motion of the electronic image capture device, and wherein at least one of the plurality of second parameters comprises the determined second parameter.

* * * * *